US010834367B2

(12) United States Patent
Hsiao

(10) Patent No.: US 10,834,367 B2
(45) Date of Patent: Nov. 10, 2020

(54) EVENT DETECTING AND RECORDING SYSTEM, MANAGEMENT METHOD AND ACTIVATING METHOD FOR INFORMATION CAPTURING DEVICE

(71) Applicant: GETAC TECHNOLOGY CORPORATION, Hsinchu County (TW)

(72) Inventor: Wei-Chung Hsiao, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/141,750

(22) Filed: Sep. 25, 2018

(65) Prior Publication Data
US 2019/0208169 A1 Jul. 4, 2019

Related U.S. Application Data

(60) Provisional application No. 62/613,331, filed on Jan. 3, 2018.

(51) Int. Cl.
*H04N 7/18* (2006.01)
*H04N 5/232* (2006.01)
*G08B 13/196* (2006.01)
*H04W 24/04* (2009.01)

(52) U.S. Cl.
CPC ....... *H04N 7/188* (2013.01); *G08B 13/19645* (2013.01); *G08B 13/19656* (2013.01); *H04N 5/23203* (2013.01); *H04N 7/181* (2013.01); *H04W 24/04* (2013.01)

(58) Field of Classification Search
CPC combination set(s) only.
See application file for complete search history.

(56) References Cited

U.S. PATENT DOCUMENTS

| | | | |
|---|---|---|---|
| 7,855,729 B2 * | 12/2010 | Onodera | H04N 5/77 348/159 |
| 2011/0018998 A1 | 1/2011 | Guzik | |
| 2012/0307071 A1 * | 12/2012 | Nishida | H04N 5/23206 348/159 |
| 2014/0341484 A1 | 11/2014 | Sebring | |
| 2015/0106061 A1 * | 4/2015 | Yang | G08C 17/00 702/188 |
| 2015/0358576 A1 * | 12/2015 | Hirose | G11B 27/36 348/143 |
| 2016/0043827 A1 | 2/2016 | Filson et al. | |
| 2016/0286156 A1 * | 9/2016 | Kovac | H04N 5/28 |
| 2017/0085648 A1 | 3/2017 | Aw et al. | |

FOREIGN PATENT DOCUMENTS

| | | | | |
|---|---|---|---|---|
| JP | 2008271349 A | * | 11/2008 | |
| WO | WO-2011094873 A1 | * | 8/2011 | G08B 25/06 |
| WO | WO 2014/144628 A2 | | 9/2014 | |

* cited by examiner

Primary Examiner — Peet Dhillon

(57) ABSTRACT

A management method for an information capturing system includes: detecting communication connections of a plurality of information capturing devices; and when the communication connection of any of the information capturing device is abnormal, generating and outputting a trigger signal to the other of the information capturing devices so as to cause the other of the information capturing devices to execute an information capturing process in response to the trigger signal.

4 Claims, 4 Drawing Sheets

EVENT DETECTING AND RECORDING SYSTEM, MANAGEMENT METHOD AND ACTIVATING METHOD FOR INFORMATION CAPTURING DEVICE

CROSS-REFERENCE TO RELATED APPLICATIONS

The present application claims the benefit of U.S. provisional Patent Application No. 62/613,331, filed on Jan. 3, 2018, the disclosure of which is hereby incorporated by reference herein in its entirety.

BACKGROUND OF THE INVENTION

Field of the Invention

The present invention relates to an event detecting and recording technology and, more particularly, to an event detecting and recording system, a management method and an activating method for an information capturing device.

Description of the Prior Art

In general, an information capturing device is portable and can be used for capturing medium data such as video and audio. With the rising of security awareness of the general public, a portable information capturing device, featuring both portability convenience and live information capturing capability, can serve as a secure auxiliary device and is extensively applied in various fields.

In various applications, law enforcement officers (polices officers and peacekeepers) are ones who most frequently carry portable information capturing devices. When law enforcement officers conduct criminal investigation, video and audio recordings are usually collected to safeguard crime evidence. Furthermore, with the popularity of education and the upsurge of human rights in the modern lawful society, marching and gathering participants also at the same time record video and audio of law enforcement officers. To prevent later unnecessary disputes, completely recording an entire process in intact without any omission is an optimal safeguarding means.

Therefore, in regard to law enforcement officers arriving at protest, marching or crime scenes, how to effectively record on-site video and audio without any omission is a focus subject matter of law enforcement officers.

SUMMARY OF THE INVENTION

In emergencies, law enforcement officers usually do not have time to manually activate an information capturing device, or it may be discovered only when evidence collection needs to be performed that an information capturing device is malfunctional or out of power, resulting in the failure of real-time on-site video and/or audio recording.

In view of the above, the present invention discloses an event detecting and recording system, a management method and an activating method for an information capturing device, which are adapted to ensure communication connections between a manager and a plurality of information capturing devices, and are capable of real-time switching to another information capturing device to assist on-site video and/or audio recording when any of the information capturing devices is abnormal.

In one embodiment, a management method for an information capturing device includes: detecting communication connections of a plurality of information capturing devices; and when the communication connection of any of the information capturing devices is abnormal, generating and outputting a trigger signal to the other of the information capturing devices so as to cause the other of the information capturing devices to execute a first information capturing process in response to the trigger signal.

In one embodiment, an activating method for an information capturing device includes: outputting a status signal according to a time interval; detecting a status response corresponding to the status signal; and executing an information capturing process when the status response is not received.

In one embodiment, an event detecting and recording system includes a plurality of information capturing devices and a manager. Each of the information capturing devices outputs a status signal according to a time interval. The manager determines, according to the time interval, whether the status signal from each of the information capturing devices is received. When the status signal is received, the manager returns a status response to the corresponding information capturing device. Conversely, when the status signal is not received, the manager determines that the communication connection status of the corresponding information capturing device is abnormal, and outputs a trigger signal to the other of the information capturing devices, so as to cause the other of the information capturing devices to execute a first information capturing process in response to the trigger signal.

DETAILED DESCRIPTION OF THE EMBODIMENTS

Figure 1:
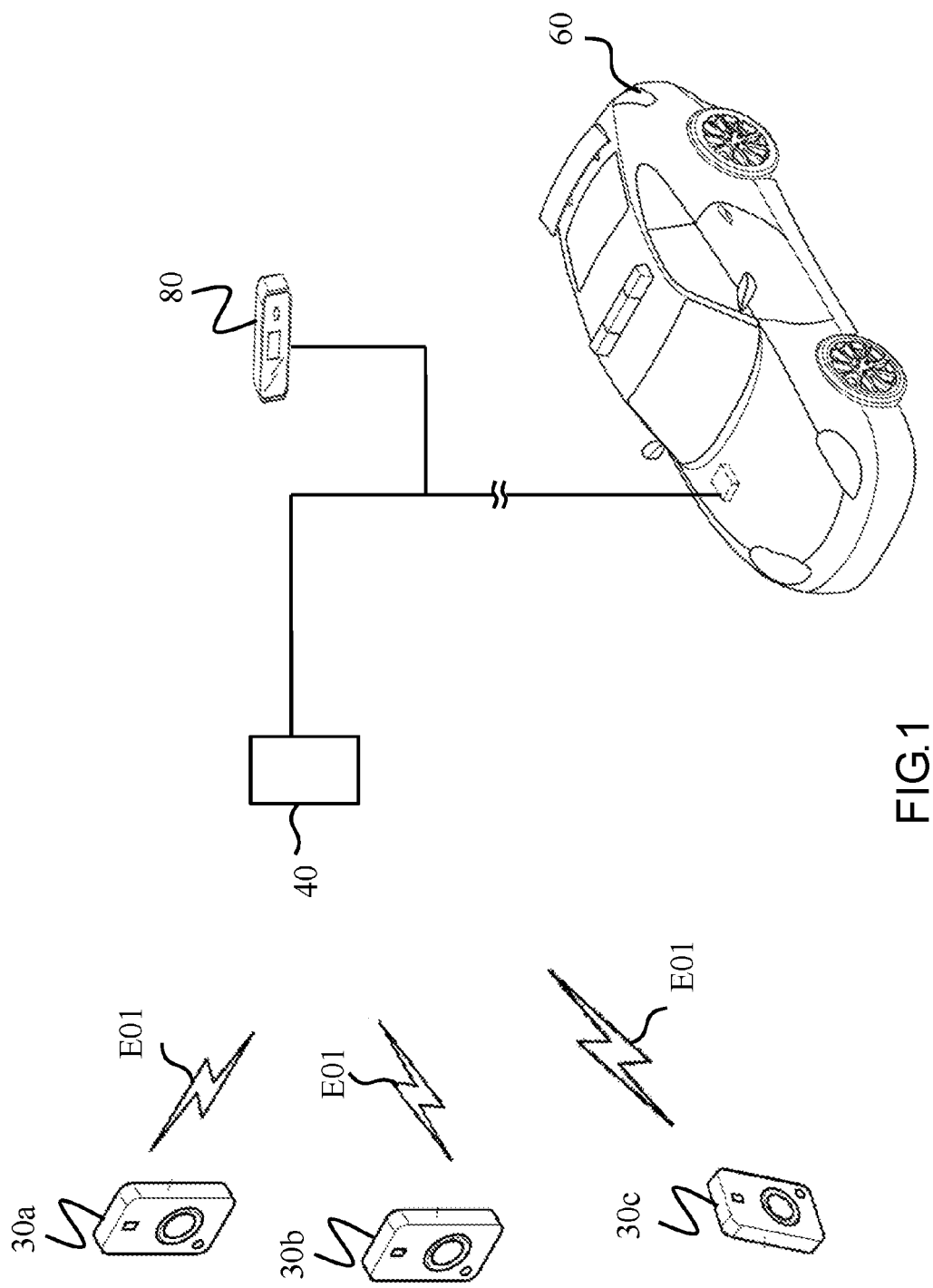
FIG. 1 is a schematic diagram of the status of an information capturing system according to an embodiment of the present invention.

FIG. 1 is a schematic diagram of the status of an information capturing system according to an embodiment of the present invention.

Referring to FIG. 1, an event detecting and recording system includes a plurality of information capturing devices and a manager 40. Three information capturing devices are given as an example below; however, the number of information capturing devices is not a limitation of the present invention. For better illustration, the plurality of information capturing devices are respectively referred to as a first information capturing device 30a, a second information capturing device 30b and a third information capturing device 30c. In some embodiments, the manager 40 may be mounted in a police vehicle 60, and use an in-vehicle battery of the police vehicle 60 or a built-in battery of the manager 40 as a power source.

In normal operations, the manager 40 is communicatively connected by a wireless communication E01 to the first information capturing device 30a, the second information capturing device 30b and the third information capturing device 30c, respectively. Furthermore, the manager 40 keeps communicatively connected to the information capturing devices. In some embodiments, the wireless communication E01 may adopt the Short Range Wireless (SRW) technology that includes the Wireless Fidelity (WiFi), Bluetooth (BT), Near-Field Communication (NFC) and Zigbee technology.

In some embodiments, when any of the information capturing devices executes an information capturing process to start recording on-site video and/or audio, this information capturing device simultaneously informs the manager 40 that the operation status thereof is "capturing information". In one exemplary embodiment, when the manager 40 receives the notification from any of the information capturing devices that the operation status thereof is "capturing information," the manager 40 may broadcast a trigger signal to other information capturing devices peripheral to this information capturing device, so as to cause the other peripheral information capturing devices to also start executing the information capturing process.

Furthermore, a confirmation process of the communication connection status of each of the information capturing devices and the manager 40 is performed periodically.

Figure 2:
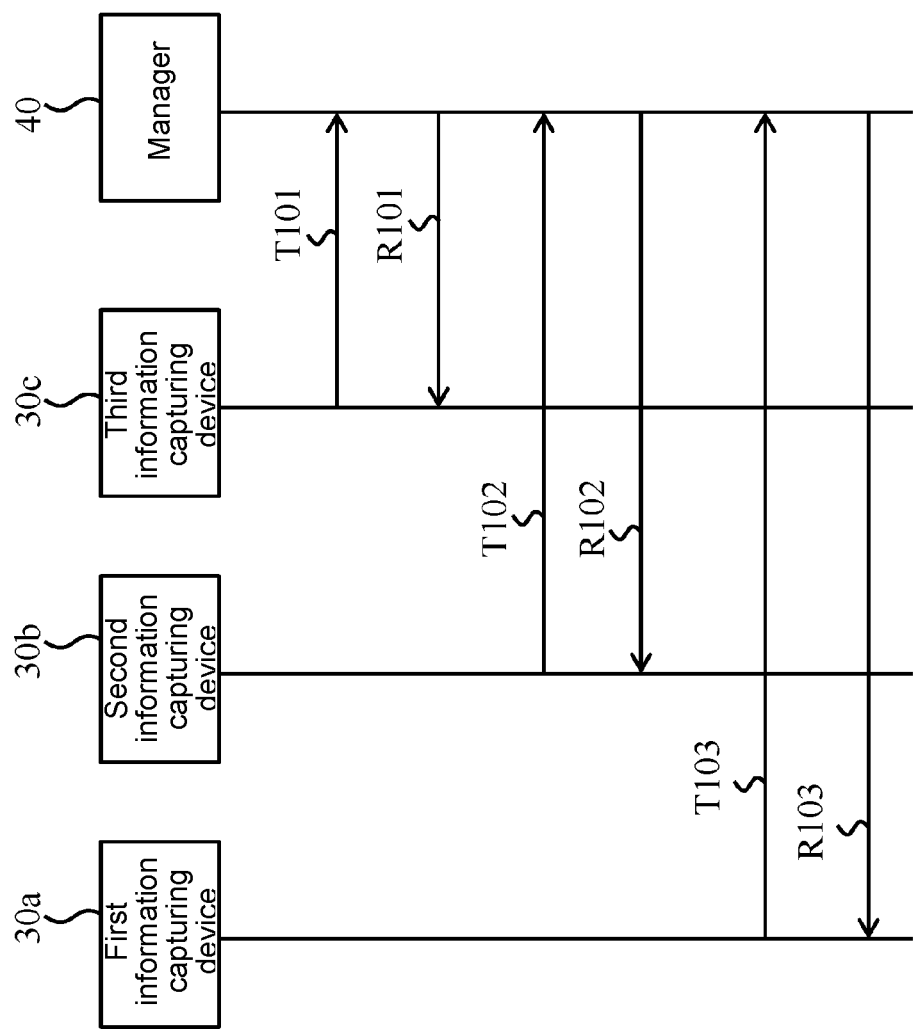
FIG. 2 is a schematic diagram of normal communication connections between a plurality of information capturing devices and a manager according to an embodiment of the present invention.

FIG. 2 shows a schematic diagram of normal communication connections between a plurality of information capturing devices and a manager according to an embodiment of the present invention.

Referring to FIG. 1 and FIG. 2, each of the information capturing devices outputs a status signal according to a time interval and transmits the status signal to the manager 40 via the wireless communication E01. In other words, the third information capturing device 30c outputs a status signal T101 according to a time interval, the second information capturing device 30b outputs a status signal T102 according to a time interval, and the first information capturing device 30a outputs a status signal T103 according to a time interval. The manager 40 receives the status signal T101, the status signal T102 and the status signal T103 at different time points or at the same time point. In some embodiments, the time interval may be 10 seconds to 10 minutes.

In some embodiments, the manager 40 can learn the communication connection status of an information capturing device according to whether the status signal transmitted from the information capturing device is received in the time interval, and record the operation status of each of the information capturing devices in a status table. The status table may be stored in a storage unit. In other words, the storage unit is for storing the communication connection statuses of the information capturing devices and the manager 40.

In some embodiments, in addition to learning the communication connection status of an information capturing device according to whether the status signal transmitted from the information capturing device is received, the manager 40 can further learn the operation status (e.g., whether the information capturing process is executed or not executed) of the information capturing device according to the status signal transmitted from this information capturing device, and record the operation status of each of the information capturing devices in the status table.

In some embodiments, the manager 40 may have a device table that records legal information capturing devices (i.e., the first information capturing device 30a, the second information capturing device 30b and the third information capturing device 30c). The manager 40 detects the communication connection statuses of all legal information capturing devices recorded in the device table at a time interval, i.e., whether the status signals transmitted from all of the information capturing devices are received. The device table may be stored in the storage unit.

When the manager 40 receives the status signal transmitted from any of the information capturing devices, the manager 40 determines that the communication connection status of the information capturing device is normal, and labels the communication connection status of the information capturing device as normal in the status table. After receiving the status signal, the manager 40 generates a status response according to the status table and returns the status response to the information capturing device that transmitted the status signal. Thus, the information capturing device can learn whether the communication connection status with the manager 40 is normal according to whether the status response is received.

For example, after receiving the status signal outputted from the third information capturing device 30c, the manager 40 determines that the communication connection status of the third information capturing device 30c is normal, and labels the communication connection status of the third information capturing device 30c as normal in the status table. At this point, the manager 40 generates a status response R101 according to the status table and returns the status response R101 to the third information capturing device 30c. After receiving the status response R101, the third information capturing device 30c confirms that the communication connection status with the manager 40 is normal.

After receiving the status signal outputted from the second information capturing device 30b, the manager 40 determines that the communication connection status of the second information capturing device 30b is normal, and labels the communication connection status of the second information capturing device 30b as normal in the status table. At this point, the manager 40 generates a status response R102 according to the status table and returns the status response R102 to the second information capturing device 30b. After receiving the status response R102, the second information capturing device 30b confirms that the communication connection status with the manager 40 is normal.

Similarly, after receiving the status signal outputted from the first information capturing device 30a, the manager 40 determines that the communication connection status of the first information capturing device 30a is normal, and labels the communication connection status of the first information capturing device 30a as normal in the status table. At this point, the manager 40 generates a status response R103 according to the status table and returns the status response R103 to the first information capturing device 30a. After receiving the status response R103, the first information capturing device 30a confirms that the communication connection status with the manager 40 is normal.

In some embodiments, in addition to determining whether the communication connection status with the manager 40 is normal, the information capturing device can also learn whether the communication connection statuses of other legal information capturing devices with the manager 40 are normal according to the status response.

In one exemplary embodiment, after receiving the status response R103, the first information capturing device 30a can learn the communication connection status of the second information capturing device 30b with the manager 40 and the communication connection status of the third information capturing device 30c with the manager 40 according to the status response R103.

When the communication connection status of any one of the second information capturing device 30b and the third information capturing device 30c with the manager 40 is abnormal, the first information capturing device 30a executes an information capturing process to start recording on-site video and/or audio. Conversely, when the communication connection statuses of both of the second information capturing device 30b and the third information capturing device 30c are normal, the first information capturing device 30a maintains the current operation status.

Figure 3:
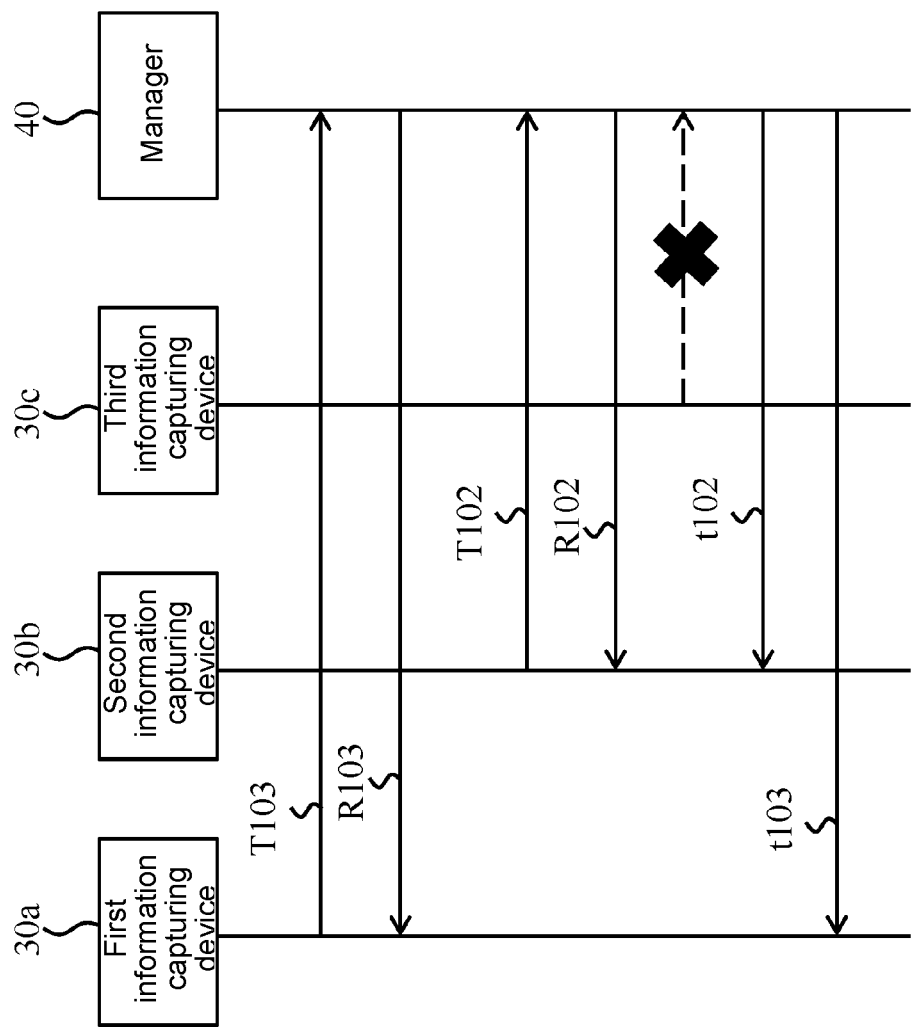
FIG. 3 is a schematic diagram of abnormal communication connections between a plurality of information capturing devices and a manager according to another embodiment of the present invention.

FIG. 3 shows a schematic diagram of abnormal communication connections between a plurality of information capturing devices and a manager according to another embodiment of the present invention.

In some embodiments, when the manager 40 detects that the communication connection status of any one of the information capturing devices is abnormal, the manager 40 generates and outputs a trigger signal to other legal information capturing devices, so as to cause the other of the information capturing devices to execute the information capturing process (hereinafter referred to as "a first information capturing process") in response to the trigger signal, and to start recording on-site video and/or audio. In some other embodiments, an information capturing device that cannot connect with the manager 40 due to signal abnormality also proactively executes an information capturing process. For example, when the communication connection status between the first information capturing device 30a and the manager 40 is abnormal, the first information capturing device 30a itself also proactively activates the first information capturing process to start recording on-site video and/or audio. Thus, in some embodiments, if the manager 40 discovers an abnormal situation, the communication between the manager 40 and the information capturing device can be interrupted, hence causing the information capturing device to proactively activate the first information capturing process due to the abnormality in the communication connection status between the information capturing device and the manager 40.

Referring to FIG. 1 and FIG. 3, assume that the third information capturing device 30c does not output a status signal after the time interval is timed out, the second information capturing device 30b outputs a status signal T102 within a time interval, and the first information capturing device 30a outputs a status signal T103 within a time interval. At this point in time, the manager 40 starts timing after the status signal of the third information capturing device 30c is previously received, and does not receive the status signal from the third information capturing device 30c after the time interval is timed out. The manager 40 determines that the communication connection status of the third information capturing device 30c is abnormal because the status signal from the third information capturing device 30c is not received in the time interval, and labels the communication connection status of the third information capturing device 30c as abnormal in the status table. Meanwhile, because the manager 40 receives the status signal T102 from the second information capturing device 30b in the time interval, the manager 40 determines that the communication connection status of the second information capturing device 30b is normal. Thus, the manager 40 outputs a trigger signal t102 to the second information capturing device 30b, and the second information capturing device 30b activates and executes a first information capturing process in response to the trigger signal t102. In a similar step, the manager 40 receives a status signal t103 from the first information capturing device 30a in the time interval, and determines that the communication connection status of the first information capturing device 30a is normal. Thus, the manager 40 outputs a trigger signal t103 to the first information capturing device 30a, and the first information capturing device 30a activates and executes the first information capturing process in response to the trigger signal t103. The foregoing first information capturing process is that the information capturing device itself starts recording on-site video and/or audio.

In some embodiments, when the manager 40 determines that the communication connection status of the third information capturing device 30c is abnormal, the manager 40 executes an information capturing process (hereinafter referred to as "a second information capturing process") in addition to outputting a trigger signal to the other of the information capturing devices, so as to start recording on-site video and/or audio.

In some embodiments, the communication connection statuses between the manager 40 and the plurality of information capturing devices are abnormal, which means that there is no signal communications back and forth between the manager 40 and the information capturing device. One possible scenario is that, the information capturing device has a power shortage and has already shut down or entered hibernation. Thus, the manager 40 does not receive any status signal from the information capturing device, the information capturing device is far from the manager 40, or the information capturing device is hindered by an obstruction and cannot send a status signal. In another possible scenario, the information capturing device is damaged and cannot transmit any status signal. The above scenarios cause the communication statuses of the information capturing device with the manager 40 to be abnormal.

In some embodiments, a wireless communication E02 may adopt a remote distance communication technology which is one of 2G communication supporting GSM900 and GSM1800, 2.5G communication using time-division multiplexing access (TDMA), 3G communication using code-division multiplexing access (CDMA), 4G communication using high-speed packet access (HSPA), 5G communication using extremely high frequency (EHF) electromagnetic waves.

In some embodiments, as shown in FIG. 1, the manager 40 is electrically connected to a vehicle recorder 80. In general, the vehicle recorder 80 may be mounted right in the front of the police vehicle 60 (the part of the driver's seat) or at the tail of the police vehicle 60 (the license plate or tail lights at the rear end), or one vehicle recorder 80 may be mounted at both of the front and the tail of the police vehicle. The present invention does not limit the number and positions of the vehicle recorder 80, and a possible implementation is described herein.

In some embodiments, before law reinforcement officers are dispatched for operations or conducting routine operations, the manager 40 has already established identifiers ID of the first information capturing device 30a, the second information capturing device 30b and the third information capturing device 30c through internal network configurations in the status table of the manager 40. The manager 40 determines which of the information capturing devices belong to the same group (the same manager) according to the foregoing status table, so that respective managers 40 do not make incorrect determinations when the information capturing devices on multiple police vehicles 60 are simultaneously dispatched for operations.

Figure 4:
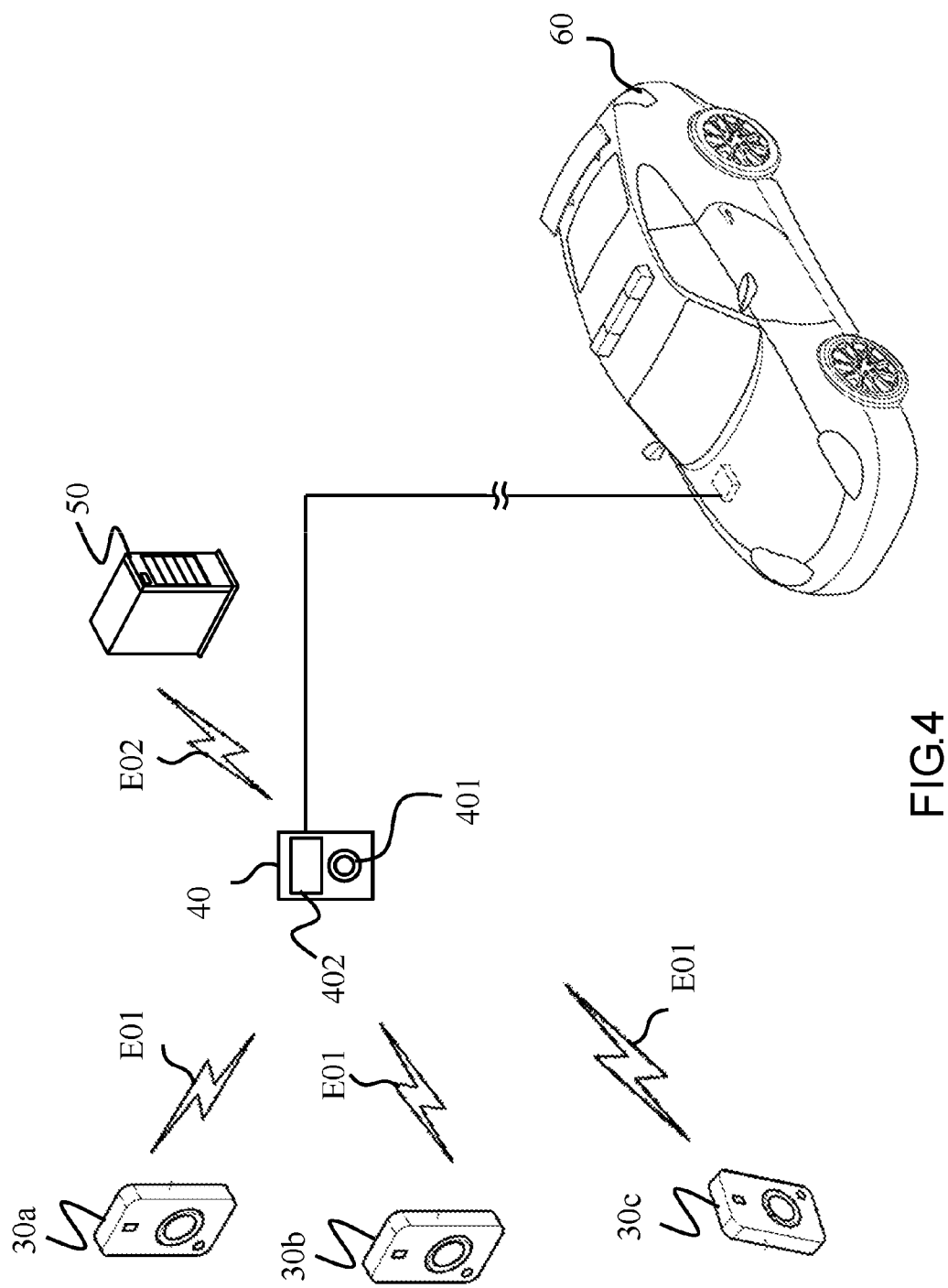
FIG. 4 is a schematic diagram of the statuses of the information capturing devices according to another embodiment of the present invention.

In some embodiments, as shown in FIG. 4, the connection between the manager 40 and a server 50 is established by means of the wireless communication E02. When the communication connection statuses between the plurality of information capturing devices and the manager 40 are normal, as shown in FIG. 2, the manager 40 transmits a report message to the server 50 to report that the respective communication connection statuses between the manager 40 and the first information capturing device 30a, the second information capturing device 30b and the third information capturing device 30c are currently normal, and no abnormality exists. In one exemplary embodiment, the server 50 may be set up in a surveillance center that is controlled by staff on duty 24 hours so as to ensure real-time reporting in case of unexpected and sudden events. In another exemplary embodiment, the server 50 may be an in-vehicle computer with which the manager 40 communicates by the wireless communication E02; that is, the manager 40 in a police vehicle communicates with an in-vehicle computer (i.e., the server 50) in another police vehicle.

In one embodiment, the manager 40 referring to FIG. 4, the manager 40 includes a display 402 that may be a monitor, a liquid crystal display (LCD) or a light emitting diode (LED) display. The display 402 is for displaying connection images of the first information capturing device 30a, the second information capturing device 30b and the third information capturing device 30c with the manager 40. The manager 40 may further include a camera unit that has a lens 401. The lens 401 may be one of a fisheye lens or a wide-angle lens, and shoots events taking place at the location of the police vehicle 60. The manager 40 may be electrically connected to the vehicle recorder 80. The police vehicle 60 is electrically connected to the manager 40 and the vehicle recorder 80, respectively.

The present invention provides an event detecting and recording system, a management method and an activating method for an information capturing device, which are adapted to ensure operation relationships of communication connections between a manager and a plurality of information capturing devices. When the communication has become abnormal in any of the information capturing devices, other information capturing devices can be switched on in real time to assist the recording of on-site video and/or audio.

It should be noted that, although the steps are described sequentially in an order, the order is not to be construed as a limitation to the present invention. One person skilled in the art can understand that the sequences of some of the steps may be performed simultaneously or exchanged.

While the present invention has been above described by some exemplary embodiments, it is to be understood that the scope of the present invention is not limited thereto. It should be noted that, simple equivalent variations and modifications made in accordance with the appended claims and this specification are to be encompassed within the scope of the present invention.

What is claimed is:

1. A management method for an event detecting and recording system comprising a plurality of information capturing devices and a manager, comprising:

outputting by the plurality of information capturing devices, a status signal according to a time interval;

detecting, by the manager using a status table, that the status signal from each of the information capturing devices is received according to the time interval, and when the status signal is received, returning a status response to the corresponding information capturing device, wherein each information capturing device and the manager learn the communication status for the corresponding information capturing device using the status response, detecting, by the manager using the status table, that the status signal from a given one of the information capturing devices is not received according to the time interval, and thereby determining that the communication connection status of the given one of the information capturing devices is abnormal;

in response to the communication connection status of the given one of the information capturing devices being abnormal, generating and outputting, by the manager, a trigger signal to the other of the information capturing devices; and starting execution of a first information capturing process by the other information capturing devices in response to the receipt of the trigger signal, wherein the first information capturing process by all of the plurality of information capturing devices is not executing until the trigger signal is received; and wherein the first information capturing process comprises capturing video.

2. An event detecting and recording system, comprising:

a plurality of information capturing devices, each of the information capturing devices configured to output a status signal according to a time interval; and a manager, configured to determine using a status table whether the status signal from each of the information capturing devices is received according to the time interval, and when the status signal is received, return a status response to the corresponding information capturing device, wherein each information capturing device and the manager learn the communication status for the corresponding information capturing device using the status response, and when the status signal of a given one of the information capturing devices is not received, determine that the communication connection status of the given one of the information capturing devices is abnormal and output a trigger signal to the other of the information capturing devices;

wherein the other of the information capturing devices are configured to start executing a first information capturing process in response to receipt of the trigger signal, and wherein the first information capturing process by all of the plurality of information capturing devices is not executing until the trigger signal is received; and wherein the first information capturing process comprises capturing video.

3. The management method of claim 1, wherein the first information capturing process comprises recording on-site video and/or audio.

4. The event detecting and recording system according to claim 2, wherein the first information capturing process comprises recording on-site video and/or audio.

* * * * *